(12) United States Patent
Saal et al.

(10) Patent No.: US 6,447,685 B1
(45) Date of Patent: Sep. 10, 2002

(54) METHOD FOR SEPARATING MULTI-PHASE MIXTURES OF SOLVENTS HAVING SMALL DIFFERENCES IN DENSITY

(75) Inventors: Hans-Udo Saal; Ralf-Matthias Saal, both of Rheinbreitbach (DE)

(73) Assignee: Satec U.S.A. LLC, Port Monmouth, NJ (US)

( * ) Notice: Subject to any disclaimer, the term of this patent is extended or adjusted under 35 U.S.C. 154(b) by 0 days.

(21) Appl. No.: 09/591,319

(22) Filed: Jun. 9, 2000

(30) Foreign Application Priority Data

Jun. 9, 1999 (DE) .......................... 199 26 313

(51) Int. Cl.$^7$ ........................................... B01D 17/022
(52) U.S. Cl. .................. 210/662; 210/663; 210/689; 210/708; 210/709; 210/744; 210/745; 210/746; 210/799; 210/804; 210/805; 210/DIG. 5; 8/142
(58) Field of Search ................. 210/708, 709, 210/739, 740, 744, 745, 746, 799, 800, 803, 804, 805, 96.1, DIG. 5, 662, 663, 689; 8/142

(56) References Cited

U.S. PATENT DOCUMENTS

| | | | |
|---|---|---|---|
| 2,048,140 A | * 7/1936 | Renfrew et al. ............ 208/185 |
| 3,104,222 A | * 9/1963 | Fuehring ............... 210/DIG. 5 |
| 3,451,234 A | * 6/1969 | Palmer ........................ 137/172 |
| 3,951,814 A | * 4/1976 | Krueger ...................... 210/488 |
| 4,011,158 A | * 3/1977 | Cook .......................... 210/259 |
| 4,036,701 A | 7/1977 | Clay et al. ................... 202/204 |
| 4,299,665 A | 11/1981 | Clay et al. ................... 202/204 |
| 4,650,581 A | 3/1987 | Angles et al. .............. 210/398 |
| 4,954,222 A | 9/1990 | Durr et al. ................... 202/176 |
| 5,017,294 A | 5/1991 | Durrieu ....................... 210/708 |
| 5,480,547 A | * 1/1996 | Williamson et al. ........ 210/533 |
| 5,612,490 A | * 3/1997 | Carlson et al. .............. 210/708 |
| 5,681,462 A | 10/1997 | Brockhoff et al. .......... 210/253 |
| 6,086,635 A | * 7/2000 | Berndt et al. .................. 8/142 |
| 6,113,765 A | * 9/2000 | Wagner et al. .............. 204/556 |
| 6,149,802 A | * 11/2000 | Zavarise et al. ............ 210/104 |

OTHER PUBLICATIONS

ABC Verfahrenstechnik, p. 214.

* cited by examiner

Primary Examiner—Peter A. Hruskoci
(74) Attorney, Agent, or Firm—Horst M. Kasper

(57) ABSTRACT

The invention relates to an apparatus for separating water-containing solvent mixtures having two or more phases, using one or two gravitational separators (4, 16) and to the use of this apparatus, and also to a process for separating water-containing solvent mixtures having two or more phases. Using the novel apparatus it is possible to separate even small-density-difference solvent mixtures having two or more phases. To this end, a coalescence separator (1) has been provided upstream of the first gravitational separator (4).

15 Claims, 1 Drawing Sheet

METHOD FOR SEPARATING MULTI-PHASE MIXTURES OF SOLVENTS HAVING SMALL DIFFERENCES IN DENSITY

The invention relates to an apparatus for separating water-containing solvent mixtures having two or more phases, with a gravitational separator, and to the use of the apparatus, and also to a process for separating water-containing solvent mixtures having two or more phases.

In a variety of industrial cleaning processes, mixtures occur of polar (water) and non-polar solvents (organic solvents) and require separation. Textile-cleaning plants for dry cleaning are an example of this. They operate predominantly with non-polar organic solvents, such as halogenated or non-halogenated hydrocarbons, e.g. tetrachloroethane (perc) or isoparaffinic hydrocarbons (HCS).

When the cleaned textiles are dried, the solvent is evaporated in a stream of hot air and then condensed out in a condenser. During this, water is entrained alongside the organic solvent and is a second phase alongside the organic solvent in the condensate. To allow reuse of the solvent for dry cleaning textiles, the aqueous phase has to be removed.

This also applies when distillation is used to treat the soiled organic solvent used for textile cleaning. Here again, before the organic solvent is reused the aqueous phase has to be removed.

Finally, this also applies when distillation is used in sectors other than dry cleaning to treat soiled organic solvents. Here again, after distillation and prior to reuse of the organic solvent the aqueous phase frequently has to be removed.

The water is usually removed in gravitational separators. The difference in the density of organic solvent and water, which are practically insoluble in one another, results in separation of the water from the organic solvent in the separator. If the density of the water is higher, it settles at the base, and if it is lower it floats on top of the solvent, and in both cases can be discharged. This procedure can be carried out effectively and without difficulty for the commonly used dry cleaning solvents, such as tetrachloroethene (perc) with a density of 1620 kg/m3 (at 20œ C.) and hydrocarbon solvents (HCS) with a density of about 780 kg/m3 (at 15œ C.).

One of the reasons why the use of other solvents (e.g. aliphatic glycol ethers) suitable for removing specific types of soiling fails is that the density of these is very little different (less than 100 kg/m3) from that of water, so that in the prior art relating to water separators no reliable process is available for the required separation of the condensed organic solvent from the water. It has therefore hitherto been impossible to use these types of solvent, which could give great advantages in the cleaning of certain types of product.

The object of the invention was therefore to provide an apparatus for separating water-containing solvent mixtures having two or more phases, e.g. for textile cleaning plants, and capable of effectively removing water, even when the density difference from the organic solvent is small. For the purposes of the present invention, a small density difference is in particular a difference of less than 100 kg/m3.

This object is achieved by an apparatus with the features of FIG. 1.

By virtue of the fact that there is a connection between a feed line of the gravitational separator and the outlet of at least one coalescence separator, and that therefore a coalescence separator has been provided upstream of the gravitational separator, relatively large droplets of water or, respectively, of organic solvent are first produced in the condensate resulting from the reclaim of the solvent used for textile cleaning. If the solvent mixture, which by this stage comprises droplets (normally of water) which are substantially larger than in the condensate immediately after its deposition, is fed to a gravitational separator it has been found that, even when the density differences are small, the separation rate achieved is then sufficient for industrial application. On the other hand, the increase in the separation rate permits smaller dimensioning of the gravitational separator.

For the purposes of the present invention, coalescence is the complete merging of bubbles or drops in a fluid once they have approached one another (cf. "ABC Verfahrenstechnik" [The A to Z of Process Engineering], VEB Verlag Leipzig, 1979). A precondition for this complete merging is that the particles contact one another and that the layer situated between the particles break apart.

A suitable method for increasing the droplet size has been found to be charging the coalescence separator with an open-pore solvent-resistant foam, for example. Using a polyurethane/polyester foam material has proven particularly suitable. The pore size of the foam here is preferably from 440 to 520 (m.

A further improvement in the separation of aqueous and organic phase is achieved if a circulation line has been provided between gravitational separator and coalescence separator. Via this circulation line, that proportion of the solvent mixture in which the separation into aqueous and organic solvent is not yet sufficient can be fed back to the coalescence separator, where enlargement of the droplet size again occurs. The inlet to the circulation line is preferably in a central region of the gravitational separator in which incompletely separated mixture is present during operation.

It is advantageous for the amount of the solvent mixture fed back again into the coalescence separator to be controlled so that no water, or only a small amount of water, emerges at the exit from the gravitational separator for the organic solvent. To this end, a sensor may have been provided in the gravitational separator, e.g. based on conductivity measurement or opacity measurement. The arrangement of this sensor is such that a signal is triggered if water passes close to or into the exit of the gravitational separator. This signal causes the opening of a valve, whereupon that portion of the solvent mixture in which separation into aqueous and organic phase is not yet sufficient is fed again to the coalescence separator, e.g. with the aid of a pump.

The feed of the solvent mixture from the coalescence separator into the gravitational separator can produce turbulence in the gravitational separator. To achieve the highest possible purity of solvent passing out of the gravitational separator it is intended that the feed line provided between the coalescence separator and the gravitational separator should open into the gravitational separator at a distance vertically from the surface of the solvent and at a distance vertically from the base of the gravitational separator. By increasing the height of fill (=designed height) of the gravitational separator it is possible to increase the residence time of the solvent/water mixture, and this is particularly advantageous if the difference in density between the polar and non-polar phase is very small.

If the difference in density between the organic solvent and the water is very small, it is also advantageous for a second gravitational separator to be used to increase the fill height and thus prolong the residence time. The required rise in fill height can be achieved using a second feed line, provided between the first and second gravitational separators and arranged so that one solvent phase, preferably the organic solvent phase, is fed from the first gravitational separator to the second gravitational separator. The feed may in particular use the pipe-link principle.

Turbulence is produced in the first gravitational separator by the feed of the solvent mixture from the coalescence separator and the circulation line optionally provided from the first gravitational separator to the coalescence separator. This, together with the surfactants and other surface-active substances present in the solvent mixture makes it possible that when the density difference between aqueous and organic solvent is very small there can still be water present in the organic solvent discharged from the gravitational separator. It is therefore advantageous for a second gravitational separator to have been provided, in which further phase separation can occur. Attention should be paid here to reduce turbulence as far as possible, and also preferably to keeping the flow rate low. It is therefore particularly advantageous for the connection between the first and second gravitational separators to use the pipe-link principle. The separated aqueous phase is refed to the first gravitational separator. As an alternative to the installation of a second gravitational separator, the design height of the first gravitational separator may be increased appropriately if space is available.

The novel apparatus is particularly suitable for separating solvent mixtures from textile cleaning. The use of the apparatus is particularly advantageous if the solvent mixture has been formed from water and an organic solvent of comparable density, in particularly propylene glycol ether (density 960 kg/m3) or a polydimethylsiloxane (density about 960 kg/m3).

A further advantage is achieved if the higher-density phase collected in the lower part of the gravitational separator and separated off is discharged automatically. This phase may in particular be water. This objective is achieved by using a sensor in the lower part of the gravitational separator to establish whether the water has separated from the organic solvent. If this is the case, the sensor opens the run-off valve, activating discharge of the water collected. The operation of the sensor may be based on conductivity measurement or opacity measurement, for example.

A further object of the invention was to provide a process which can separate a water-containing solvent mixture having two or more phases, where the constituents of the mixture have comparable density.

The novel process comprises the steps:
feeding a condensed-out water-containing solvent mixture containing two or more phases to a coalescence separator;
enlarging the volume of the droplets, preferably of the water droplets, in the coalescence separator;
feeding the solvent mixture with enlarged droplet volume to a gravitational separator;
separating the solvent mixture in the gravitational separator into a first phase which is composed predominantly or exclusively of organic solvent (phase A), into a second phase, which comprises a mixture of organic solvent and water (phase B), and also into a third phase, which is composed predominantly of water (phase C).

If the density difference is very small it is advantageous for the second phase to be circulated between the gravitational separator and coalescence separator, preferably with control via a sensor. The sensor detects, for example, the water content of the phase present. Improved phase separation can also be achieved by increasing the fill height of the gravitational separator.

The water content in the organic solvent can be further reduced if the first phase is fed to a second gravitational separator, preferably at a low flow rate and with low turbulence, and in particular using the pipe-link principle. Further separation of the solvents takes place in the second gravitational separator.

The invention is described below in greater detail with reference to the figures, in which FIG. 1 is a diagram of the structure of the novel apparatus in an embodiment which is suitable for an organic solvent with a density below 1000 kg/m3, composed of a combination of coalescence separator and one gravitational separator;

Figure 1:
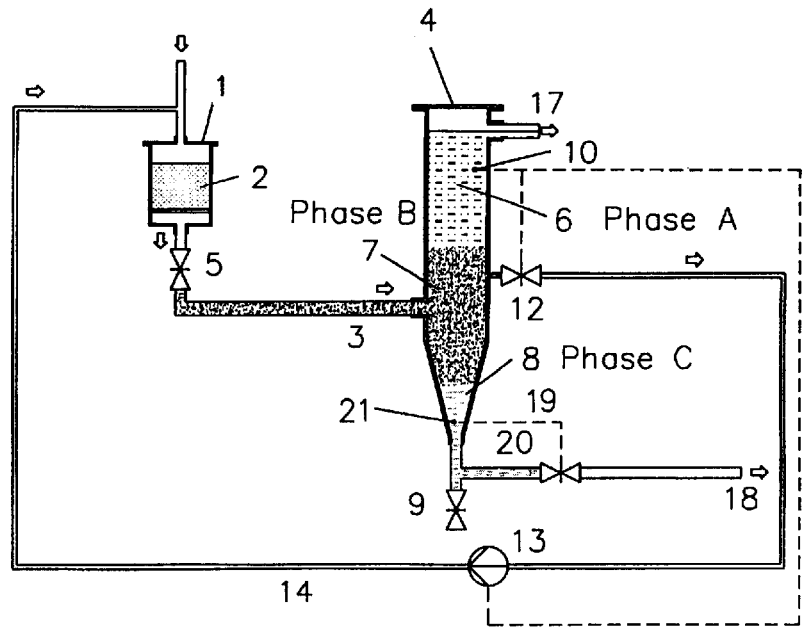
FIG. 1 shows an embodiment of the novel apparatus for a solvent mixture made from water and an organic solvent whose density is lower than that of water. The novel plants are particularly suitable for separating solvent systems having two or more phases and in which the difference in density between the individual solvent components is less than 100 kg/m3.
Figure 2:
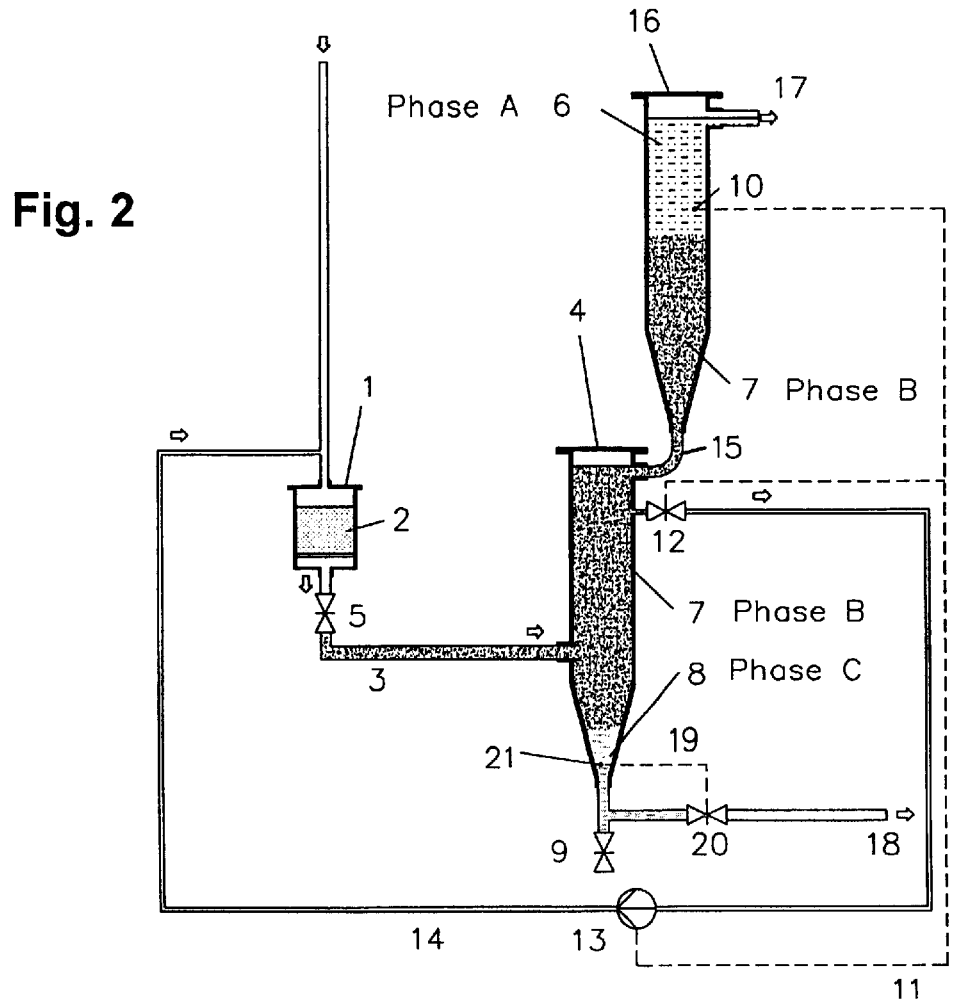
FIG. 2 is a diagram of the structure of the novel apparatus in an embodiment which is suitable for an organic solvent with a density below 1000 kg/m3, composed of a combination of coalescence separator and two gravitational separators.

Plants for dry cleaning textiles comprise drum cleaners, drum dryers, heating systems, hot-air supply for drying, condenser for the solvent and, respectively, solvent/water mixture, and, if desired, a distillation boiler with condenser. FIGS. 1 and 2 show only a part of a cleaning plant of this type in which the separation of the mixture made from water and organic solvent takes place.

The solvent/water mixture from the condenser (not shown) passes first into the coalescence separator 1. This solvent mixture generally has very small water droplets in the organic solvent. In the coalescence separator 1 the mixture passes through a filler material 2, composed of solvent-resistant and water-resistant foam, for example, with the result that the water droplets become larger and the water substantially separates from the organic solvent.

The mixture made from water and organic solvent then flows continuously via a feed line 3 to a gravitational separator 4. The feed line 3 opens into the gravitational separator 4 in such a way that the feed takes place below the liquid surface, enabling separation of the organic solvent. The inflow into the gravitational separator 4 can be regulated via the controllable valve 5 arranged in the feed line 3.

The mixture made from organic solvent and water separates in the gravitational separator 4 into an upper phase A (6), which is composed predominantly of organic solvent, and into a middle phase B (7), which is composed of a mixture made from water and from organic solvent. Finally, a lower phase C (8) is also produced and is composed predominantly of water.

The height of the middle phase B is controlled with the aid of a sensor 10 arranged inside the gravitational separator 4, e.g. by measuring conductivity or opacity. If the phase B rises above a maximum level, the sensor 10 gives a signal to the valve 12 and the pump 13, which have been arranged in series in a circulation line 14, via the control lines 11. The circulation line 14 leads from the gravitational separator 4 to the coalescence separator 1, so that the mixture made from water and organic solvent is passed via the circulation line 14 back to the coalescence separator 1. This forms a closed circuit between the gravitational separator 4 and the coalescence separator 1, in which the mixture made from water and organic solvent can circulate. The coalescence separator again enlarges the water droplets, increasing the rate of separation of solvent from water, and the height of phase B in the gravitational separator 4 is reduced. In this way the phase B is prevented from reaching the outflow line 17 at the upper end of the gravitational separator.

Phase A, which has already become separated from the water, passes via the outflow line 17 back into the cleaning plant to be used again.

The height of the phase C collected in the lower part of the gravitational separator 4 is monitored by a sensor 21, e.g. by measuring conductivity or opacity. If the surface of the liquid of phase C rises above the sensor, the sensor 21 passes a control pulse to the outlet valve 20 via the control line 19. The outlet valve 20 has been arranged in an outflow line 18 running from the base of the gravitational separator 4 and opens until required to shut again by the sensor 21.

As an alternative to the discharge described for phase C, controlled via the sensor 21, this phase can also be discharged via the outlet valve 9 arranged in the base of the gravitational separator 4.

The structure of the novel apparatus shown in FIG. 2 is an embodiment which is suitable for an organic solvent with a density below 1000 kg/m3, and is composed of a combination of a coalescence precipitator 1 with two gravitational precipitators 4, 16. The additional gravitational precipitator 16 has been coupled via a feed line 15, which runs from the upper end of the first gravitational precipitator 4 to the base of the second gravitational precipitator 16. The sensor 10 described above, which monitors the height of phase B and actuates the control elements (valve 12, pump 13) in the circulation line 14, has been arranged in the side wall of the second gravitational precipitator 16.

In terms of the process, the difference between the apparatus of FIG. 2 and that of FIG. 1 is as follows:

Instead of removal via the outflow line 17 as shown in FIG. 1, in the apparatus of FIG. 2 the solvent/water mixture (phase B) is passed to the second gravitational separator 16 via the feed line 15 using the pipe-link principle.

In this almost zero-flow separator 16 any residual amounts of water still present and not dissolved in the organic solvent can separate. This water can be refed to the first gravitational separator 4 via the line 15, now serving as a return line from the second to the first gravitational separator. The solvent 6, comprising no free water, flows through the outflow line 17 back into a solvent tank (not shown) to be used again for cleaning. In this instance the sensor 10 has been placed in the second gravitational separator 16. The course of the process is otherwise identical with the procedure described above.

In FIGS. 1 and 2, the structure described for the novel apparatus is for the embodiment in which the organic solvent has a density lower than that of water, i.e. the organic phase has been arranged above the aqueous phase in the mixture. However, using the description and information in the introduction and in the patent claims, the skilled worker needs no inventive activity in order to design the apparatus for cases where the organic phase has a density greater than that of the aqueous phase.

| Key: | |
|---|---|
| 1 | Coalescence separator |
| 2 | Fill |
| 3 | Feed line |
| 4 | Gravitational separator |

| -continued | |
|---|---|
| Key: | |
| 5 | Valve |
| 6 | Phase A |
| 7 | Phase B |
| 8 | Phase C |
| 9 | Outlet valve |
| 10 | Sensor |
| 11 | Control line |
| 12 | Valve |
| 13 | Pump |
| 14 | Circulation line |
| 15 | Feed line |
| 16 | Gravitational separator |
| 17 | Outflow line |
| 18 | Outflow line |
| 19 | Control line |
| 20 | Valve |
| 21 | Sensor |

What is claimed is:

1. A process for separating water-containing solvent mixtures having two or more phases comprising the steps
   a) feeding the mixture to be separated to a coalescence separator (1);
   b) enlarging a volume of droplets of one component of the mixture in the coalescence separator (1);
   c) feeding the solvent mixture with enlarged droplet volume to a gravitational separator (4);
   d) separating the solvent mixture in the gravitational separator (4) into a first phase A (6), which is composed predominantly of solvent, into a second phase B (7), which comprises a mixture of water and solvent, and into a third phase C (8), which is composed predominantly of water, wherein the second phase B (7) is pumped from the gravitational separator (4) to the coalescence separator (1), and the pumping is controlled via a sensor (10), which detects the level of the second phase B (7) in the gravitational separator (4).

2. The process as claimed in claim 1, wherein the third phase C (8) is discharged from the gravitational separator (4) and the discharge is controlled via a sensor (21) detecting the level of the third phase C (8).

3. A process for separating water-containing solvent mixtures comprising
   feeding a mixture of water and of an organic solvent to a coalescence separator;
   passing the mixture in the coalescence separator through a filler material;
   feeding the mixture to a gravitational separator through a feed line in such a way that the feed in point is below a liquid surface of the gravitational separator;
   separating the mixture in the gravitational separator into an upper phase composed predominantly of organic solvent, into a middle phase composed of water and of organic solvent, and a lower phase predominantly composed of water, wherein the middle phase is pumped from the gravitational separator to the coalescence separator, and the pumping is controlled via a sensor, which detects the level of the middle phase in the gravitational separator.

4. The process for separating water-containing solvent mixtures according to claim 3, wherein the mixture fed to the coalescence separator comprises small water droplets dispersed in an organic solvent; and further comprising
   employing the filler material composed of solvent resistant foam;

enlarging the water droplets in the filler material;

substantially separating the water from the organic solvent in the filler material.

5. The process for separating water-containing solvent mixtures according to claim 3 further comprising regulating the feeding of the mixture into the gravitational separator with a control valve disposed in the feed line.

6. The process for separating water-containing solvent mixtures according to claim 3 further comprising controlling the height of the middle phase in the gravitational separator with the sensor, wherein the sensor is arranged inside the gravitational separator.

7. The process for separating water-containing solvent mixtures according to claim 6 further comprising measuring the electrical conductivity of the middle phase with the aid of the sensor.

8. The process for separating water-containing solvent mixtures according to claim 6 further comprising measuring the opacity of the middle phase with the aid of the sensor.

9. The process for separating water-containing solvent mixtures according to claim 3 further comprising feeding liquid from the middle phase into a circulation line and through a valve to an input of the coalescence separator;

delivering a signal from the sensor to the valve in case a level of the middle phase exceeds a certain maximum value.

10. The process for separating water-containing solvent mixtures according to claim 3 further comprising feeding liquid from the middle phase into a circulation line and through a pump to an input of the coalescence separator;

delivering a signal from the sensor to the pump in case a level of the middle phase exceeds a certain maximum value.

11. The process for separating water-containing solvent mixtures according to claim 3 further comprising removing the upper phase composed predominantly of organic solvent from the gravitational separator for reuse.

12. The process for separating water-containing solvent mixtures according to claim 3 further comprising monitoring a height level of the lower phase predominantly composed of water with a second sensor by measuring electrical conductivity of the lower phase;

discharging the lower phase through a discharge line with an outlet valve connected to a base of the gravitational separator;

passing a control pulse from the second sensor to the outlet valve if a surface level of the lower phase rises above the level of the second sensor.

13. The process for separating water-containing solvent mixtures according to claim 3 further comprising monitoring a height level of the lower phase predominantly composed of water with a second sensor by measuring opacity of the lower phase;

discharging the lower phase through a discharge line with an outlet valve connected to a base of the gravitational separator;

passing a control pulse from the second sensor to the outlet valve if a surface level of the lower phase rises above the level of the second sensor.

14. The process for separating water-containing solvent mixtures according to claim 3 further comprising furnishing the gravitational separator in a configuration of an upper tank disposed on top of a lower tank, wherein a top of the lower tank is connected to a bottom of the upper tank and wherein the middle phase is disposed in the area of a connection between the lower tank and the upper tank.

15. The process for separating water-containing solvent mixtures according to claim 3, wherein the mixture fed to the coalescence separator comprises small water droplets dispersed in an organic solvent; and further comprising employing the filler material composed of solvent resistant foam;

enlarging the water droplets in the filler material;

substantially separating the water from the organic solvent in the filler material;

regulating the feeding of the mixture into the gravitational separator with a control valve disposed in the feed line;

controlling the height of the middle phase in the gravitational separator with the sensor, wherein the sensor is arranged inside the gravitational separator;

measuring the electrical conductivity of the middle phase with the aid of the sensor;

measuring the opacity of the middle phase with the aid of the sensor;

feeding liquid from the middle phase into a circulation line and through a valve to an input of the coalescence separator;

delivering a signal from the sensor to the valve or pump in case a level of the middle phase exceeds a certain maximum value;

removing the upper phase composed predominantly of organic solvent from the gravitational separator for reuse;

monitoring a height level of the lower phase predominantly composed of water with a second sensor by measuring electrical conductivity of the lower phase;

discharging the lower phase through a discharge line with an outlet valve connected to a base of the gravitational separator;

passing a control pulse from the second sensor to the outlet valve if a surface level of the lower phase rises above the level of the second sensor;

monitoring a height level of the lower phase predominantly composed of water with a second sensor by measuring opacity of the lower phase;

discharging the lower phase through a discharge line with an outlet valve connected to a base of the gravitational separator;

passing a control pulse from the second sensor to the outlet valve if a surface level of the lower phase rises above the level of the second sensor furnishing the gravitational separator in a configuration of an upper tank disposed on top of a lower tank, wherein a top of the lower tank is connected to a bottom of the upper tank and wherein the middle phase is disposed in the area of a connection between the lower tank and the upper tank.

* * * * *